United States Patent

[11] 3,631,406

[72] Inventor Hans Kurner
Karlsruhe, Germany
[21] Appl. No. 878,053
[22] Filed Nov. 19, 1969
[45] Patented Dec. 28, 1971
[73] Assignee Siemens AG
Berlin and Munich, Germany
[32] Priority Nov. 22, 1968
[33] Germany
[31] P 18 10 413.7

[54] METHOD OF CONTINUOUSLY EXCHANGING DATA BETWEEN A DATA PROCESSING APPARATUS AND EXTERNAL DEVICES
2 Claims, 1 Drawing Fig.

[52] U.S. Cl. ........................................................ 340/172.5
[51] Int. Cl. ........................................................ G06f 1/04

[50] Field of Search ........................................... 340/172.5

[56] References Cited

UNITED STATES PATENTS

| | | | |
|---|---|---|---|
| 3,445,819 | 5/1969 | Cooper et al. ................ | 340/172.5 |
| 3,475,731 | 10/1969 | Figueroa et al. .............. | 340/172.5 |
| 3,478,321 | 11/1969 | Cooper et al. ................ | 340/172.5 |
| 3,516,069 | 6/1970 | Bray et al. ...................... | 340/172.5 |

*Primary Examiner*—Gareth D. Shaw
*Assistant Examiner*—Harvey E. Springborn
*Attorney*—Edwin E. Greigg

ABSTRACT: For a continuous exchange of data between the memory of a data processing apparatus and external devices, the data are alternately stored in one of two partial ranges of said memory. While storing is in progress in one partial range, the data of the other partial range may undergo processing.

Patented Dec. 28, 1971 3,631,406
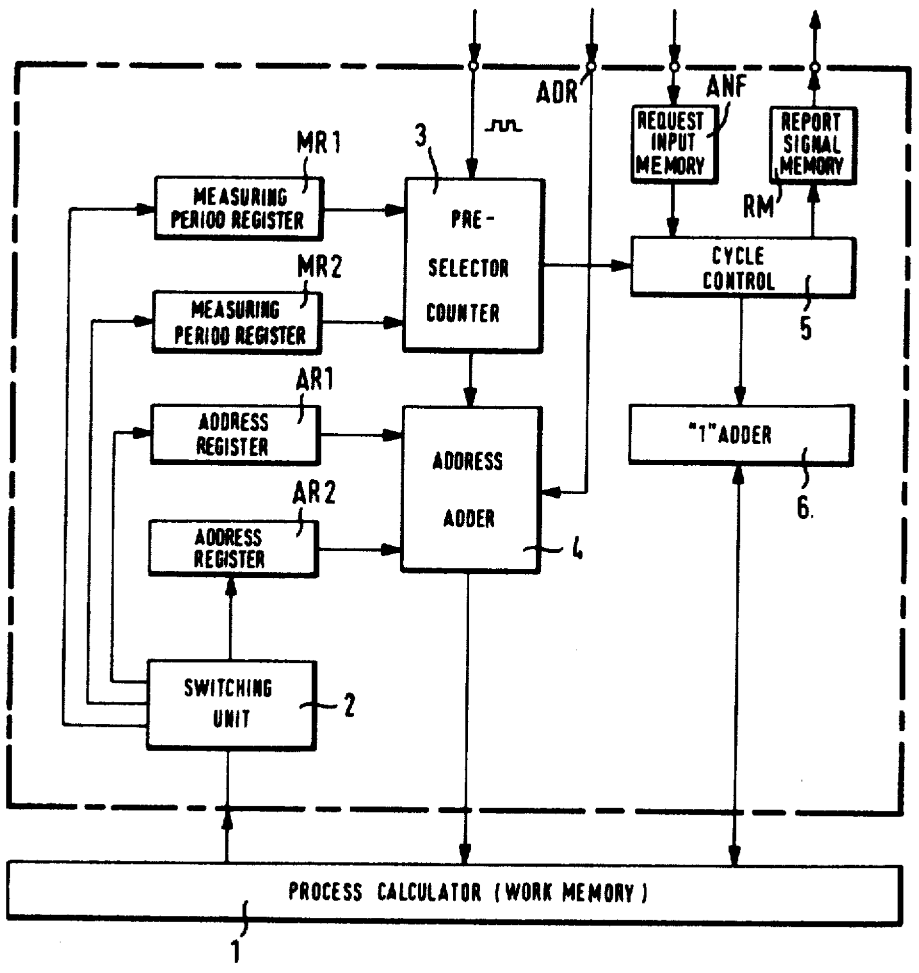
Inventor
Hans Körner
by
Edwin E. Greigg

METHOD OF CONTINUOUSLY EXCHANGING DATA BETWEEN A DATA PROCESSING APPARATUS AND EXTERNAL DEVICES

This invention relates to a method of continuously exchanging data between the memory of a data processing apparatus and external devices while simultaneously processing such data. When feeding or retrieving data into or from the memory of data processing apparatus (particularly process calculators), wherein the data supplied statistically or dependent of the process status have to be processed continuously, the difficulty is encountered that during the data feed processing is not possible.

According to the invention, the aforenoted difficulty is eliminated by alternately storing the data in one of two partial ranges of the memory; in case of data feed during the storing in one partial range, the data of the other partial range are processed, and in case of data retrieval during the insertion of the data in one partial range, the central unit of the data processing apparatus releases the data stored in the other partial range of the memory. Accordingly, the content of one partial range is free for processing by the central unit of the calculator, while the other partial range is used for the feed or retrieval.

The switching from one partial range of the memory to the other may be performed according to a further feature of the invention by alternately adding, by means of a control unit, one of two base addresses to partial addresses of the data and the data are inserted into or read out from the memory cell with the total address.

For the continuous storing of data in the presented sequence, it is advantageous to store in the control unit the base addresses of the two partial ranges of the memory and information relating to the number of cells (i.e., the cell number) the memory and after each insertion or readout step, to lower the address of cells of the pertinent partial range by "1" and to change the address by a predetermined amount, for example, to increase it by "1." When the number of cells of the memory range is reached, the storing or the readout, as the case may be, is switched to the other partial range of the memory.

Often, variables are represented in the form of impulse frequencies. Such a representation as compared to an amplitude representation is advantageous as far as simplicity, suppression of noise signals and separation of potential are concerned. By counting the number of impulses for short measuring periods, average values may be easily obtained digitally. According to a further feature of the invention, a method of and an apparatus for the central impulse counting with the aid of a calculating apparatus are provided, wherein the complexity and cost of units associated with the individual measuring stations are held at a low value.

It is known to use process calculators for counting impulses, while in the working memory of the central unit the memory cells reproduce counting chains. Each counting impulse gives a command for the "incrementing" step. An address is assigned to the impulse sender to which there may be added a base address prepared by a program. The total address is the address of a memory work cell. Upon the appearance of each impulse, the content of the memory work cell is read out, increased by "1" and the result again stored in the same memory work cell. The content of the cell then indicates how often did one and the same input information occur, for example, how often did an impulse sender forward an impulse. Such a counting process may be used, for example, in the measuring technique of nuclear physics where it may find application in connection with multichannel analyzers. These encode the impulse amplitudes into digital values whereby each value corresponds to a channel. These digital values then represent directly a partial address to which, for the determination of the work memory address, there is added a base address. Multichannel analyzers are used to measure the frequency distribution of events occurring during an experiment. Very often, the measuring period is very long in order to permit the performing of a sufficiently large number of measurements in case of statistically occurring events. In most cases, the absolute value of the measuring period has no significance.

According to another example of application, voltage frequency converters are used as impulse transmitters; the output frequency of said converters is proportionate to the output voltage of the measuring sensors. Here, the essential information is the average value of the measured magnitude over a relatively short measuring period of, for example, 100 milliseconds. The result of measurement corresponds to the time integral of the measured magnitude over the measuring period and thus equals the product of the measuring period and the impulse frequency. The accuracy of the measuring period is a substantial factor regarding the overall accuracy of the measurement.

In case a process calculator with an incrementing unit is used for purposes of the aforenoted type, at the end of the measuring period the measured values of the measuring stations are present as impulse numbers in the associated memory cells. These memory cells then have to be closed as far as feeding further impulses is concerned, in order to permit a processing of the measured values (for example, to examine them whether or not they have exceeded a predetermined limit value). In order to permit an uninterrupted progress of the measuring process, according to a further feature of the invention the impulses supplied by the memory cells as partial addresses are added in an alternating manner during a predetermined period to one of two base addresses and the content of the memory cell is, together with the total address, used for the incrementing process.

In case impulses of several independently operating impulse transmitters are counted, the impulses have to be separated in time to avoid undesired coincidences. In such a situation there may be coupled to the incrementing unit a switching circuit containing a plurality of one-bit memories which are expediently arranged in a matrixlike manner and each of which is associated with an impulse transmitter. The memories are cyclically interrogated, then to each set impulse memory there is assigned a partial address and the memory is switched over to the incrementing unit. Thereafter, the impulse memory is reset. It is thus possible to couple a plurality of impulse transmitters, such as voltage frequency converters, to calculators without the necessity of complex circuitry. The measuring periods may be formed in a simple manner by applying timing pulses to a presettable counter and when a predetermined counter reading is reached, the base addresses are switched over upon formation of the total address and a new measuring period is introduced with changed base address and presettings of the timing pulse counter. The measuring period may be freely selected by means of instruction words fed into the control unit.

The method according to the invention permits the forming of integral values by means of adding the average values incremented in the memory cells. It is further possible to graphically represent the content of the partial ranges of the work memory on a screen of a visual analog apparatus. The latter procedure may be useful, for example, for checking or trouble-shooting purposes. For switching the partial ranges, the control unit of the visual analog apparatus includes, according to the incrementing unit, a register for the base address and additionally, another register for the cells of the work memory. The switching of the partial ranges is synchronized by the incrementing unit. The registers may be charged by means of the organization program of the calculator.

The invention will be better understood as well as further objects and advantages will become more apparent from the ensuing detailed specification of an exemplary apparatus for practicing the invention taken in conjunction with the drawing, wherein the sole FIGURE is a schematic circuit diagram of an incrementing unit according to the invention.

Turning now to the FIGURE, there is shown a program-controlled calculator 1 such as a process calculator, the work memory of which is to be used for the counting of impulses. Prior to starting the counting, measuring period registers MR1 and MR2 are set to operate with measuring periods, an address register AR1 is set with a base address A for a first partial range of the work memory and an address register AR2 is set with a base address B for a second partial range of the work memory. These setting signals are applied by a switching unit 2. The latter may be of the type formed of coincidence gating means to the input of which control signals are applied by the process calculator 1. The information to be stored in the registers is applied by process calculator 1 to the switching unit 2 and is forwarded by the latter to the proper register in accordance with the aforenoted control signals.

When the impulse transmitter sends an impulse, the latter is applied to a request input memory ANF and, as a result, a cycle, control 5 is started. The latter triggers a program interruption in calculator 1 and gives an "increment" command to a "1" adder 6 which, in the embodiment shown, is disposed within the increment control unit. The said program interruption may be effected by a signal triggered by the "increment" command and applied by the "1" adder 6 to the program calculator. The command to increment, however, may be carried out within the calculator itself. In addition to the request impulse, the address of the impulse transmitter is applied across an input ADR to an address adder 4 in which the address of the impulse transmitter is added as a partial address to one of the base addresses, for example, address A stored in the address register AR1. The content of those memory work cells, whose address equals the sum of the base address and the address of the impulse transmitter, is applied to the "1" adder 6, where it is increased by "1" and then again stored in the same cell. A report signal memory RM announces the termination of the incrementing step upon receiving a report signal. By the content of a memory work cell there is meant the digital value which is stored in that cell. This value is zero in each cell at the beginning of a measuring process. If the address of a cell is called for the first time, then, subsequent to the incrementing step, in the cell the value "1" is stored. Upon calling the same cell for the second time, the value is increased to "2", etc.

The aforedescribed incrementing step is repeated as many times as a request signal and an address signal are applied to the incrementing unit. Consequently, in the memory work cells the impulses sent by the impulse transmitter are added. The information of interest, however, is the number of impulses transmitted within the time unit. Thus, the impulses have to be counted over a predetermined period. Such counting period, depending upon the nature of the measurement to be performed, may be as short as a few milliseconds or as long as several hours. This measuring period is determined by means of a preselector counter 3, which, prior to the counting process, is fed the content of the measuring time register MR1 and counts to zero by time impulses. As the counter reading "-zero" is reached, the preselected measuring period is completed, whereupon the base address B is applied to the address adder and simultaneously a new measuring period is started. Further, a report signal is applied to the process calculator, indicating that the partial range of the work memory, with the base address A, is free for processing. Subsequent to processing, the registers AR1 and MR1 may be fed new parameters.

During the measuring period of register MR2, the partial addresses are added to the base addresses. Registers AR1 and MR1 and registers AR2 and MR2 cooperate, for example, when the partial addresses are added to the base address B and the impulses sent by the impulse transmitters are summed in the other partial range of the work memory. Upon expiration of the measuring period of the register MR2, the preselector counter is charged anew, the base addresses are switched over and the partial range B of the work memory is rendered free for processing. Thus, the measuring process may progress without interruption for any length of time.

That which is claimed is:

1. A method of counting impulses emitted by impulse transmitters, comprising the following steps:

A. assigning a partial address to each impulse transmitter,

B. feeding the partial addresses into a control unit,

C. adding the partial addresses to one of two base addresses in said control unit to form a sum address, D. feeding into a "1" adder the contents of those memory cells of a process calculator, the address of which is identical to said sum address, E. increasing said contents by "1" in said "1" adder and F. storing the increased contents in their respective previous same memory cell.

2. A method as defined in claim 1, including the steps of

A. applying time impulses to a counter,

B. applying a command signal to said control unit from said counter when the latter reaches a predetermined counting stage and C. adding said partial addresses to the other of said two base addresses in said control unit upon receipt thereby of said command signal.

* * * * *